April 3, 1956  B. KOWALSKI  2,740,546
BUCKET HAVING REMOVABLE COMPARTMENTS
Filed Oct. 20, 1952  2 Sheets-Sheet 1
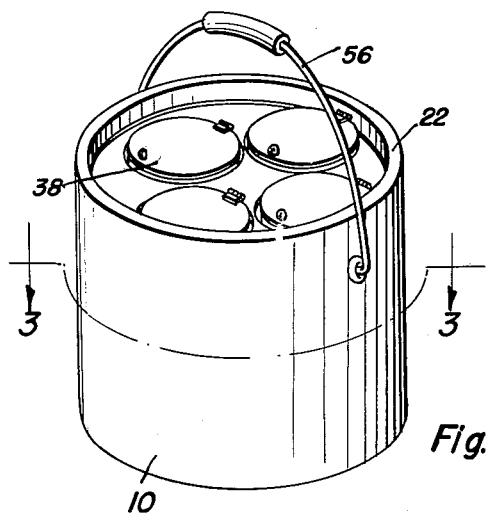
Fig. 1
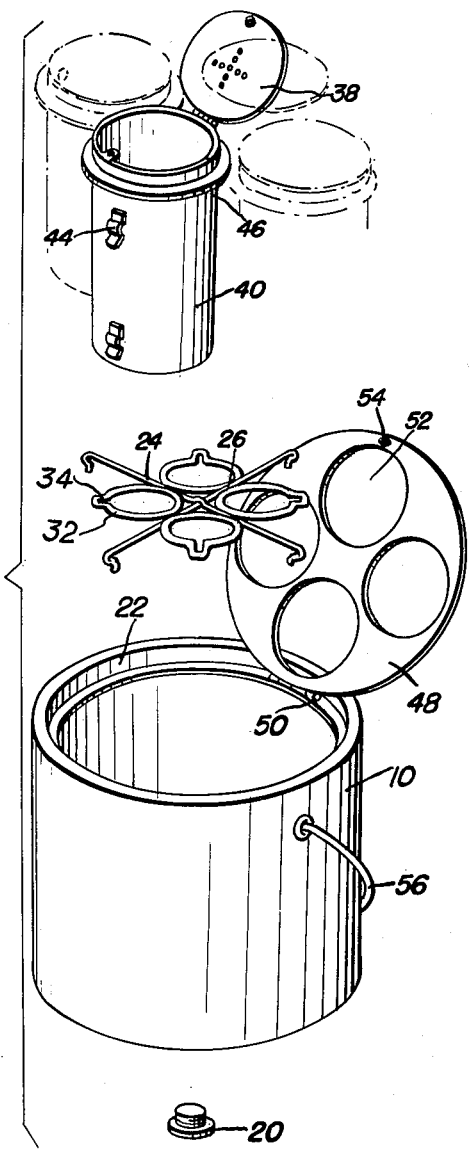
Fig. 2
Fig. 5
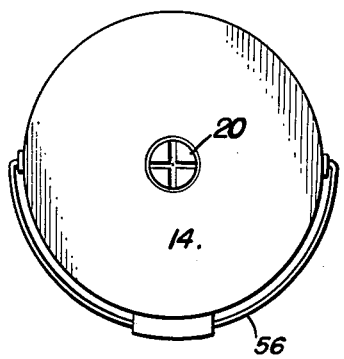
Fig. 6
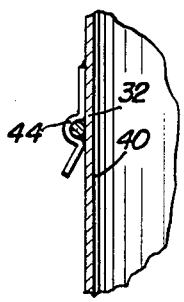
Benedict Kowalski
INVENTOR.

April 3, 1956 B. KOWALSKI 2,740,546
BUCKET HAVING REMOVABLE COMPARTMENTS
Filed Oct. 20, 1952 2 Sheets-Sheet 2

Benedict Kowalski
INVENTOR.

United States Patent Office

2,740,546
Patented Apr. 3, 1956

2,740,546

BUCKET HAVING REMOVABLE COMPARTMENTS

Benedict Kowalski, South Bend, Ind.

Application October 20, 1952, Serial No. 315,627

3 Claims. (Cl. 220—16)

This invention relates to bait containers and more particularly to a combination bucket in which both fish and different kinds of bait may be carried alive and in fresh condition.

The primary object of this invention is to provide a bait bucket which is so constructed as to allow for separately carrying different kinds of bait at one and the same time, having separately removable cans adapted to contain the required bait.

A further object of this invention is to provide means for spacing a plurality of bait cans within a bait bucket in spaced relationship to the side walls of the container so as to allow for the introduction of ice or other cooling agent in a manner to insure proper circulation about the bait cans so that the bait will remain alive and in a fresh condition.

Still further objects of the invention reside in the provision of a bait bucket that is simple in construction, strong, durable, comparatively light in weight, and which is relatively inexpensive to manufacture.

These, together with the various ancillary objects of the invention which will become apparent as the following description proceeds, are attained by this bait bucket, a preferred embodiment of which has been illustrated in the accompanying drawings, by way of example only, wherein:

Figure 1 is a perspective view of the bait bucket;

Figure 2 is an exploded perspective view of the present invention showing several of the various elements thereof in detail;

Figure 5 is a bottom plan view of the bait bucket; and,

Figure 6 is an enlarged sectional detail as taken along the plane of line 6—6 in Figure 3, showing the construction of the means for detachably securing the bait cans within the bait bucket.

Figure 3:
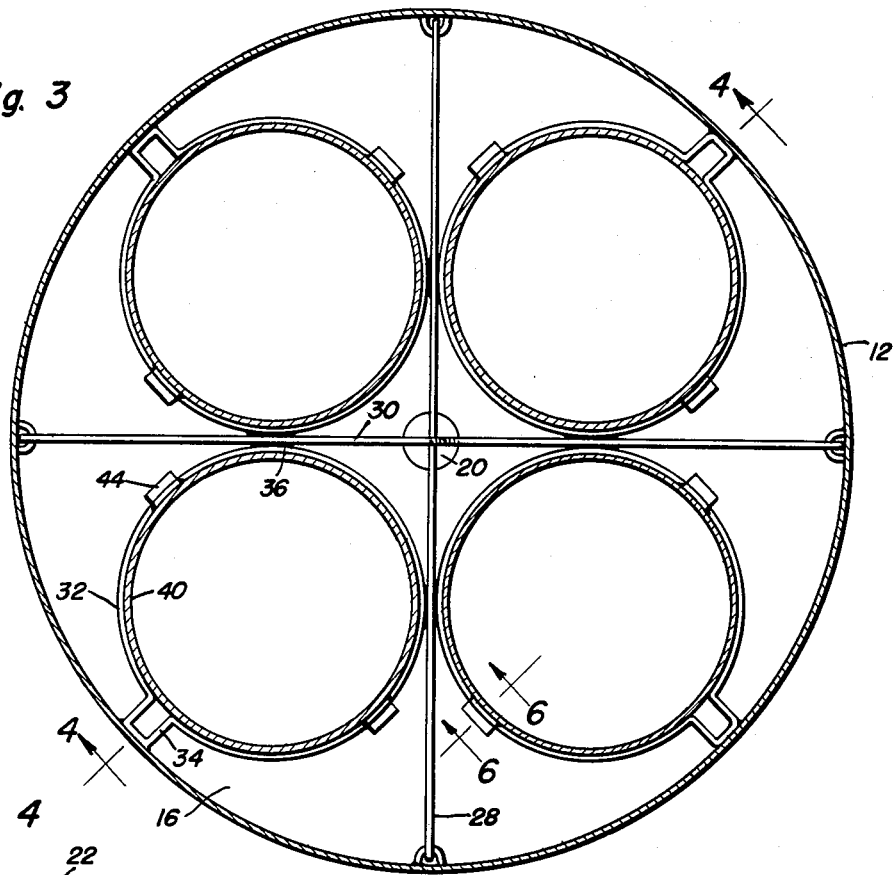
Figure 3 is an enlarged horizontal sectional view as taken along the plane of line 3—3 in Figure 1.
Figure 4:
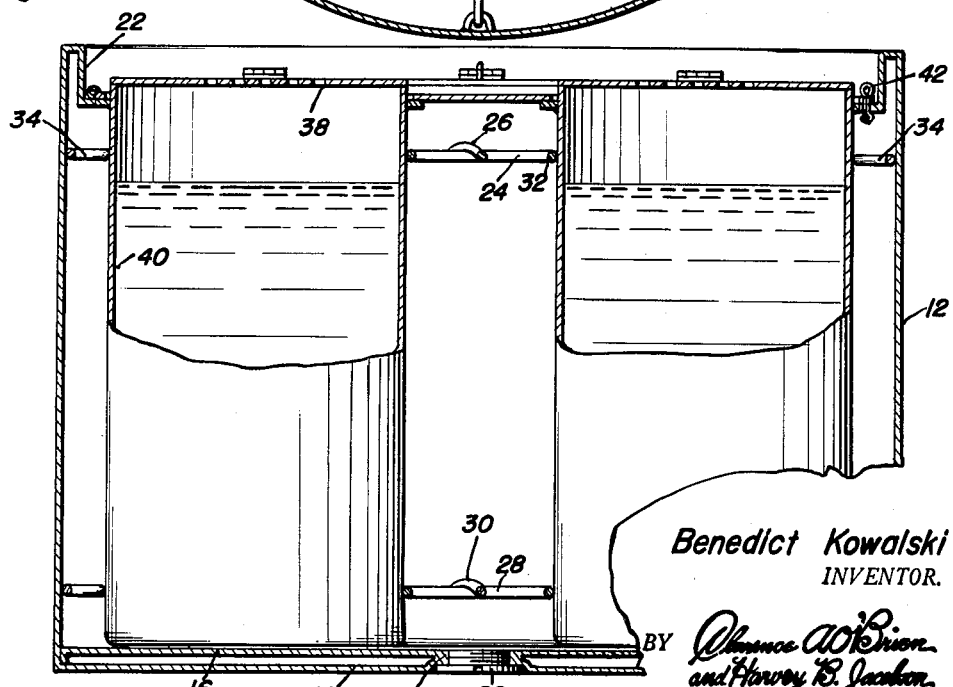
Figure 4 is a vertical sectional view as taken substantially along the plane of line 4—4 in Figure 3.

With continuing reference to the accompanying drawings wherein like reference numerals designate similar parts throughout the various views, reference numeral 10 generally designates a container which is provided with cylindrical side walls 12 and a bottom wall 14. A false bottom may be provided as at 16 which together with bottom wall 14 provides a threaded portion as at 18 for reception of drain plug 20. Secured to the upper edge of the side walls 12 is a substantially Z-shaped flange 22.

Welded or otherwise secured to the inner portions of the side walls 12 are supporting elements which consist of an upper pair of transverse rods 24 and 26, and a lower pair of transverse rods 28 and 30, each rod of each pair of rods being substantially perpendicular to each other. As can be readily seen from an inspection of Figure 3, the rods divide the container into a plurality of sections which may be four, six, or more as desired.

Attached to the pairs of rods are a plurality of ring members 32 each of which is formed with loops 34. The rings 32 are welded or otherwise attached to the rods where they are tangent to the rods as at 36.

A plurality of bait cans, as best shown in Figure 2, are provided which are cylindrical in shape and which have hinged and preferably perforated covers 38 hingedly secured to a receptacle portion 40. Suitable fasteners as is indicated at 42 are provided for holding the lids 38 of the bait cans closed. The bait cans have attached to the side walls 40 spring clips 44 which are adapted to be clipped over the rings 32. The bait cans are further provided with an annular rim or flange 46 adjacent the upper end thereof.

The container 10 has a cover 48 hingedly secured as at 50 to the Z-shaped flange 22. The cover 48 has a plurality of apertures 52 therethrough and is further provided with a spring fastener 54 engageable in an aperture in the flange 22 for holding the lid shut. A handle 56 of suitable design is provided for the container.

In use, the bait cans have the receptacle portion 40 filled with the desired bait. Each of the bait cans is positioned in the bait bucket by directing the spring portions 44 and the receptacle downwardly with the spring portions 44 in alignment with the U-shaped loop 34. When the outermost of the clips 44 has passed the upper rings 32, the cans may be rotated and further pressed downwardly until the clips 44 engage the rings 32 as can be best seen in Figure 6. Then, the lid 48 may be closed. The flanges 46 will prevent the bait cans from becoming loose and falling out of the bait bucket. This is because the flanges 46 will form stop or retaining means.

Since from the foregoing the construction and advantages of this bait bucket are readily apparent, further description is believed to be unnecessary.

However, since numerous modifications will readily occur to those skilled in the art after a consideration of the foregoing specification and accompanying drawings, it is not intended to limit the invention to the precise embodiment of bait bucket shown and described, but all suitable modifications and equivalents may be readily resorted to which fall within the scope of the appended claims.

Having thus described the invention, what is claimed as new is:

1. A bait bucket comprising an outer container having cylindrical side walls and a bottom wall secured to said side walls, substantially horizontally extending supporting rods secured to said side walls, a plurality of bait can engaging means carried by said supporting rods, and means on said bait cans detachably securing said bait cans to said supporting rods, said second means and said means carried by said supporting rods holding said cans in spaced relationship from said side walls and said bottom wall, said cans having annular flanges adjacent the upper end of said cans, a cover hingedly secured to said container, a plurality of apertures in said cover, the upper ends of said cans extending into said apertures when said cover is in closed position.

2. A bait bucket comprising an outer container having cylindrical side walls and a bottom wall secured to said side walls, substantially horizontally extending supporting rods secured to said side walls, said supporting rods including a pair of transverse members extending perpendicular to each other, substantially horizontally extending rings secured to said rods, a plurality of bait cans extending through said ring, and means on said bait cans detachably securing said bait cans in said rings, said cans having annular flanges adjacent the upper ends of said cans, a cover hingedly secured to said container, a plurality of apertures in said cover, the upper ends of said cans extending into said apertures when said cover is in closed position.

3. A bait bucket comprising an outer container having cylindrical side walls and a bottom wall secured to said side walls, substantially horizontally extending supporting rods secured to said side walls, said supporting rods including a pair of transverse members extending perpendicular to each other, substantially horizontally extending rings secured to said rods, a plurality of bait cans extending through said ring, and means on said bait cans detachably securing said bait cans in said rings, said means and said rings holding said cans in spaced relationship from said side walls and said bottom wall, said cans having annular flanges adjacent the upper ends of said cans, a cover hingedly secured to said container, a plurality of apertures in said cover, the upper ends of said cans extending into said apertures when said cover is in closed position.

References Cited in the file of this patent

UNITED STATES PATENTS

| | | |
|---|---|---|
| 113,056 | Iske | Mar. 28, 1871 |
| 747,929 | Bliss | Dec. 29, 1903 |
| 769,874 | Paar | Sept. 13, 1904 |
| 818,004 | Thornton, Jr. | Apr. 17, 1906 |
| 983,473 | Barnes | Feb. 7, 1911 |
| 989,287 | Phipps | Apr. 11, 1911 |
| 1,156,723 | Thomas | Oct. 12, 1915 |
| 1,371,336 | Welty | Mar. 15, 1921 |
| 2,428,996 | Schworm | Oct. 14, 1947 |